United States Patent
Stalego et al.

[15] 3,653,861
[45] Apr. 4, 1972

[54] APPARATUS FOR PRODUCING CURLY GLASS FIBERS

[72] Inventors: Charles J. Stalego; Robert E. Wyckoff, both of Newark, Ohio

[73] Assignee: Owens-Corning Fiberglas Corporation

[22] Filed: Aug. 27, 1970

[21] Appl. No.: 67,442

[52] U.S. Cl. .................................65/16, 18/2.6 R, 65/5
[51] Int. Cl. ....................................................C03b 37/06
[58] Field of Search......................65/5, 9, 11 R, 16; 18/2.5 R

[56] References Cited

UNITED STATES PATENTS

| 2,927,621 | 3/1960 | Slayter et al. | 65/9 |
| 3,442,633 | 5/1969 | Perry | 65/16 X |

*Primary Examiner*—S. Leon Bashore
*Assistant Examiner*—Robert L. Lindsay, Jr.
*Attorney*—Staelin & Overman and Vincent L. Barker, Jr.

[57] ABSTRACT

An apparatus for producing curly fibers from a molten stream which is pulled from a melt by high velocity attenuating fluid. The device includes a fiber forming feeder having orifices extending between a pair of elongate blowers which direct intersecting streams of high pressure fluid below the orifices to attenuate and cool the molten streams into fibers. Positioned below the orifices is a single skirt extending generally parallel to the direction of movement of the fibers and having a plurality of sinuous convolutions. High velocity air streams pulling the plastic fibers across the convolutions cause them to impinge against one or more skirt convolutions and to assume a curvilinear configuration prior to losing plasticity and leaving the skirt area. The skirt may be surrounded by a peripheral housing having air vents which permit the lateral entry of outside air pressure to further assure contact between the skirt and descending fibers.

12 Claims, 5 Drawing Figures

Patented April 4, 1972

CHARLES J. STALEGO &
ROBERT E. WYCKOFF
INVENTORS

BY

Stalin & Overman
ATTORNEYS

Patented April 4, 1972

CHARLES J. STALEGO &
ROBERT E. WYCKOFF
INVENTORS

BY

*Staelin + Overman*
ATTORNEYS

APPARATUS FOR PRODUCING CURLY GLASS FIBERS

BACKGROUND OF THE INVENTION

This invention relates to an apparatus and process for producing curly glass fibers which, after formation, may be collected on a conveyor in mat form and subsequently used in low density pack form as a filter for air or other fluids.

It is known in the prior art that curly fibers of a heat softenable material may be formed by attenuating streams of molten glass from a group of fiber forming orifices by streams of high velocity fluid in a path generally parallel to the direction of glass flow between a pair of corrugated plates or skirts extending the length of the orifice group along either side of the air flow. Such an arrangement, which is shown in U.S. Pat. No. 2,927,621 to Slayter et al., uses the turbulence of the fluid flow below the orifices or bushing to direct the fibers while still in a plastic state against the corrugated skirts on either side. When the plastic fibers strike these skirts, they impinge upon one or more skirt corrugations to assume a curly configuration which is retained as the fibers are cooled on their downward path towards a collection point. While apparatuses such as that shown in the aforementioned Slayter et al patent have operated satisfactorily to commercially produce such curly fibers, several difficulties in production are encountered which reduce the output from such installations and cause undesirable downtime and maintenance difficulties. One such difficulty is caused by the fact that the lateral distance between the plates, in order to assure fiber impingement by the majority of the fibers in the stream, is such that certain fibers striking the plates may ricochet from the plate on one side across to the other side, thus completely blocking the path for other fibers. This can quickly cause a fiber build-up between the plates which necessitates removal of the build-up prior to further fiber formation. Another difficulty caused by the presence of the two closely spaced plates on either side of the orifice group is the difficulty of inspecting the orifices themselves visually from below which needs to be done on a frequent basis to assure that they are operating properly. Finally, the presence of two closely spaced opposed skirts sometimes results in the formation of shot or small particles of hot glass which are caused by fiber impingement upon each of the plates or build-ups as previously explained.

SUMMARY OF THE INVENTION

It has been discovered that curly fibers for use in filter media and the like can be satisfactorily formed at high speed in an installation in which a single skirt positioned on one side of the orifice group is used, thus obviating several of the disadvantages in the prior art installations. In this apparatus, the single skirt is positioned below the blowers, extending along one side of the orifice group, with the fiber and fluid stream moving generally parallel to the surface of the skirt. Surrounding the skirt on all four sides is a housing having lateral openings opposite the faces of the single skirt so that air may be induced through these openings laterally into the skirt area. This induced lateral air causes the stream of fibers to impinge upon and generally assume the configuration of the corrugated skirt surface, thus causing them to take a curved or non-linear shape while in their plastic state. The ends of the single skirt terminate short of the opposed ends of the housing so that induced air flow coming around the skirt ends will prevent the fibers from moving outwardly and piling up at the ends of the skirt. Other advantages and details of the invention will be apparent from the detailed description below.

DETAILED DESCRIPTION OF THE INVENTION

Figure 1:
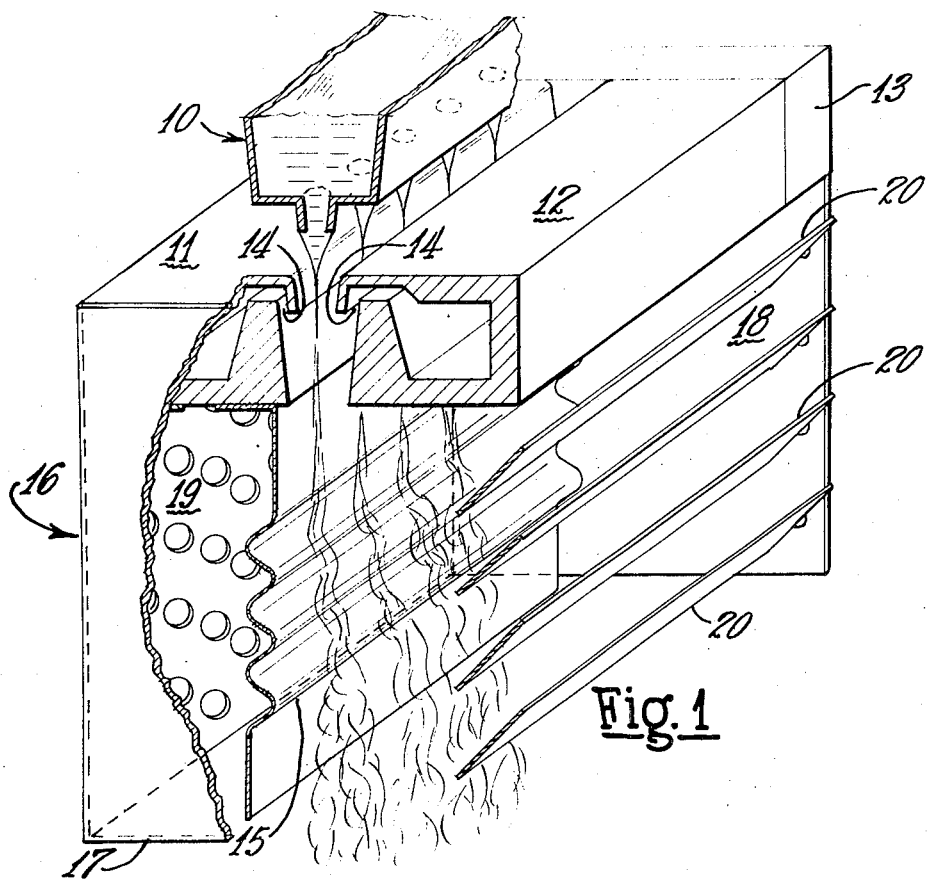
FIG. 1 is a view in perspective of a fiber forming assembly of the instant invention, schematically showing a single row of fiber forming bushings, a pair of blowers for the attenuating air, and the single skirt depending from one of the blower housings surrounded by a downwardly extending housing.

Referring first to FIG. 1, a single row or group of fiber forming orifices 10 in a feeder is shown schematically, with the axis of each orifice extending parallel to each other in a vertical plane. On either side of the vertical plane of the orifice axes is positioned a pair of blower housings 11 and 12 connected to a blower manifold 13 through which is supplied a source of high pressure attenuating fluid, such as air or steam. The outlets of the blower housings 11 and 12, indicated by reference numeral 14, are elongate openings extending alongside the row of orifices and are positioned to direct the flow of attenuating fluid downwardly and slightly inwardly so that the fluid flow from the outlets 14 will intersect the plane of the orifice axes at a point somewhat below the blowers. In preferred practice, the included angle between this plane and each of the blower outlets 14 is about twelve degrees.

Figure 2:
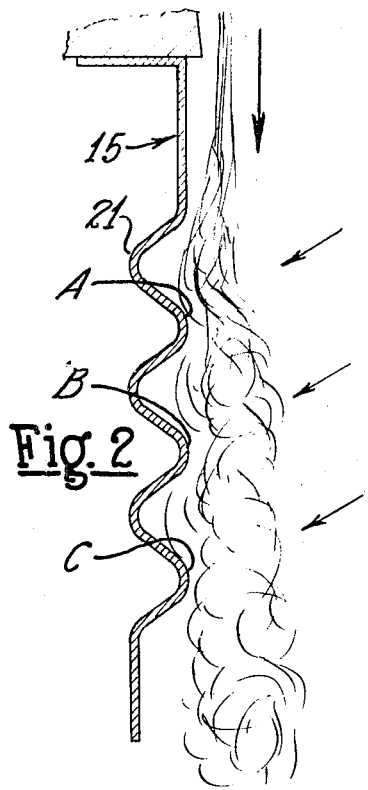
FIG. 2 is an end view of the skirt and flow of fibers, indicating schematically the curling action of the fibers as they pass downwardly along the skirt.

Extending from the lower portion of the blower housing 11 is a single skirt 15 which, as best seen in FIG. 2, has its uppermost portion secured to the lower surface of the blower housing 11. This skirt includes a plurality of parallel extending wavy corrugations or sinuous convolutions, as seen in FIG. 2, whose crests, on the fiber side of the skirt, are generally in vertical alignment with the uppermost portion of the skirt 15. The distance between these crests of the skirt 15 and the plane of the orifices preferably is about one-eighth of an inch. This distance can be adjusted by use of a conventional mechanism (not shown), such as a simple slot and set screw, or by a more convenient type of adjusting mechanism such as that shown in the aforementioned Slayter et al patent. This lateral adjusting mechanism does not form a part of the present invention.

Surrounding the skirt 15 below the blowers 11 and 12 is a depending housing 16 having opposed ends 17 and 18 on each end of the orifice row 10, a perforate side 19 and a louvered side comprised of horizontally extending blinds or louvers 20. As seen in FIG. 1, the single skirt 15 does not extend the entire length of the blower housings 11 and 12 so that there is a space between each end of the skirt and its opposed end 17 or 18 of the housing 16.

The perforate side 19 of the housing 16 is provided with fluid passages which admit outside air into the space adjacent the rear wall of the skirt 15. This air, which is induced by the high pressure air flowing along the front face of the skirt from the blowers, can pass around either end of the skirt 15 between the skirt ends and the opposed ends 17 and 18 of the housing 16 to keep the fibers from migrating away from the center of the skirt 15 towards the ends. This is important to prevent a fiber build-up at the ends of the skirt 15.

The horizontal louvers 20, which form the side of the housing opposite the front or fiber face of the skirt, may be adjusted by pivoting them on their horizontal axes to vary the amount of outside air which is induced laterally through the louvers 20 into the space adjacent the front of the skirt 15. This is the primary flow of lateral air which causes the fiber curling phenomena illustrated in FIG. 2. In FIG. 2, as the molten metal issues from the orifices 10, it is drawn downwardly by the streams of attenuating air, as shown, to the area of corrugations in the skirt 15. As the fibers proceed downwardly, the primary flow of attenuating air, which has been produced by the intersecting streams from the blower outlets 14, becomes somewhat turbulent as it approaches the upper valley or reverse crest 21 of the skirt 15. At the same time, lateral air, indicated by the arrows coming through the louvers 20, strikes the mass of fiber flow and causes it to open and impinge individual fibers upon the first crest portion of a corrugation, designated by reference numeral A on the skirt. The sinuous corrugations are shaped such that the impingement surface at area A is at less than a right angle to the direction of fiber movement. As soon as a few fibers impinge at the area A, they are slowed down, causing other fibers to impinge against them, which creates random movement among the moving fibers causing a substantial number of the fibers to curl as their movement downwardly is impeded. As the downward movement of these fibers progresses, certain ones impinge upon the next successive crest portions of the corrugations, B or C, to further create random intermingling and curling of all the fibers. In each case, the lateral air coming through the louvers 20 assists in causing the fibers to be randomly drawn against the portions A, B or C of the skirt. When the fibers reach the lowermost portion of the skirt 15, they have cooled to the point where they are no longer plastic but retain their desired non-linear configuration.

It will be seen that the effect of the lateral air flow from the louvers 20 is to drive certain ones of the fibers into the valley portions of the corrugations extending away from the crests A, B and C, which assures their impingement upon the portions A, B and C as they move downwardly. Thus the single skirt of this invention is not necessarily placed directly within the fiber flow but can be spaced therefrom by a small amount and utilize the lateral air flow to assure impingement.

Figure 3:
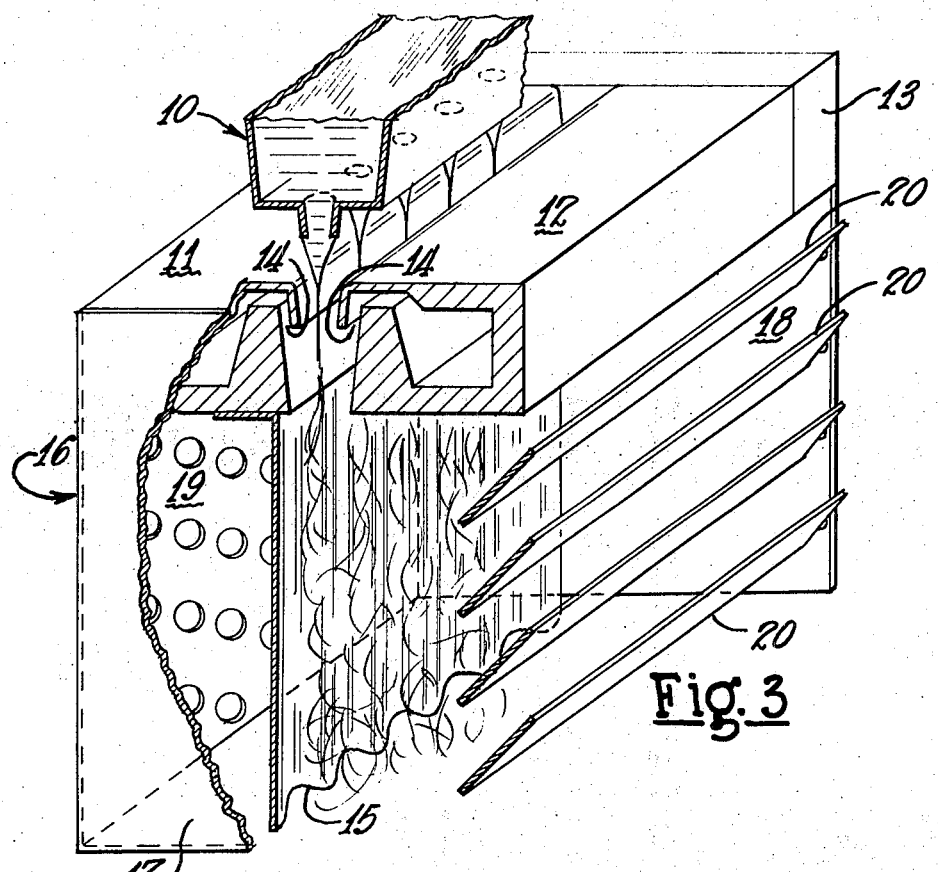
FIG. 3 is a view in perspective of a single skirt assembly of this invention, similar to FIG. 1 but showing a different skirt configuration.
Figure 4:
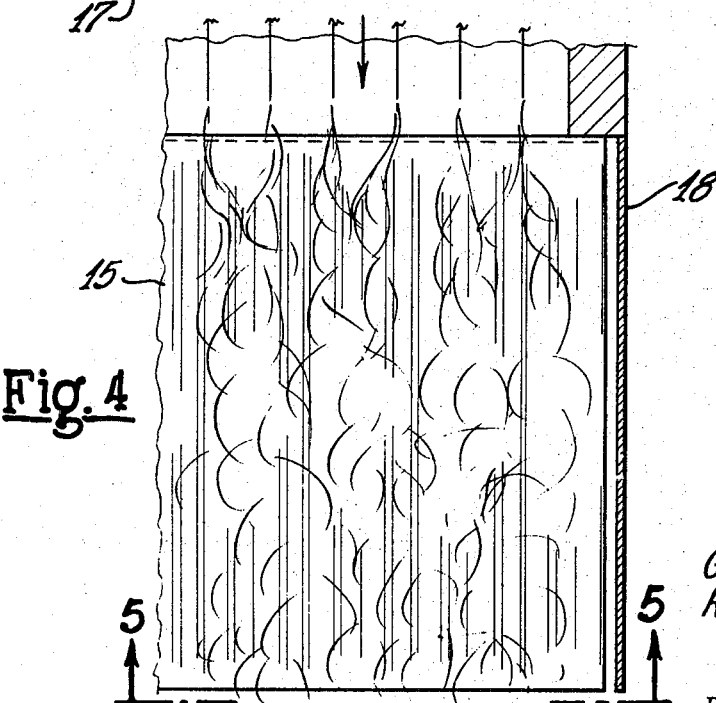
FIG. 4 is a view in elevation of the skirt shown in FIG. 3, indicating schematically the path of the fibers moving downwardly along the skirt.
Figure 5:
FIG. 5 is a view of the skirt configuration of FIGS. 3 and 4, taken along 5—5 of FIG. 4.

Another embodiment of the instant invention is illustrated in FIGS. 3, 4 and 5, where like reference numerals are used for like parts. The embodiment of FIGS. 3, 4 and 5 is essentially similar to that shown in FIGS. 1 and 2 except for the direction of the corrugations or sinuous convolutions of the skirt 15. In this embodiment, the parallel extending corrugations of the skirt 15 are generally vertical, that is, their crests and valleys extend parallel to the general movement of the fibers. The phenomena of curling in the embodiment is illustrated in FIG. 4 which, in a view in elevation, shows the planar mass of fibers moving downwardly along the skirt. In this embodiment, lateral air through the open louvers 20 causes certain of the fibers to strike the crests of the convolutions, as was the case with the embodiment of FIGS. 1 and 2. After striking, the fibers are moved either to the left or the right, as shown in FIG. 4, to be opposite a valley on either side of a crest. When this happens, other fibers coming down along the valley strike these fibers and are moved to the left or the right to further become curled by striking still other fibers or the crest portion of the corrugations. In this embodiment, fiber interaction is improved and the possibility of fiber build-up and shot formation is virtually eliminated. As was the case with the previous embodiment, the edges of the skirt 15 are spaced from the opposed ends 17 and 18 of the housing so that lateral air through the perforations in the side plate 19 is drawn around the edges of the skirt to keep the fibers from building up at the edges.

From the above description of two embodiments of the instant invention, it can be seen that the assembly using a single skirt below a fiber forming bushing has certain advantages over the prior art and also relies upon a somewhat different fiber formation process. Rather than having two opposed skirts which cause alternate impingement of the fibers as they proceed on their downward path, the instant invention using a single skirt relies upon the phenomena of induced lateral air to cause the fibers to impinge one or more times upon the single skirt. This has the advantage of reduction of fiber build-up difficulties and shot formation and also reduces the number of parts in a given installation while improving the ability of the operator to observe the process and inspect the bushings for possible malfunction.

Other advantages of the instant invention will be apparent to those skilled in the art and various modifications may be made without departing from the scope of the attached claims.

We claim:

1. An apparatus for producing curly fibers from attenuating streams of molten material comprising, in combination, an elongate group of fiber forming orifices having parallel extending axes in a generally vertical plane, a pair of elongate blowers adjacent said orifice group and positioned to direct streams of high velocity attenuating fluid from each side of said group to intersect at a point below said group in said vertical plane, a single depending rigid skirt extending alongside said group generally parallel to said plane and below said group, said skirt having a plurality of sinuous corrugations with spaced apart crest portions of successive corrugations extending toward said plane, and means for admitting amounts of induced air flow against said fibers in a lateral direction towards said skirt whereby plastic fibers attenuated by said stream will pass said skirt and impinge upon one or more portions thereof prior to leaving said skirt area.

2. The apparatus of claim 1 wherein said skirt is surrounded on all sides by a peripheral housing having means defining openings laterally adjacent each face of said skirt to cause gaseous flow from said blowers along said plane to induce lateral air flow through said openings into said housing.

3. The apparatus of claim 2 wherein certain fluid openings in said skirt have means adjustable in area to vary the amount of lateral air flow into said housing.

4. The apparatus of claim 1 wherein said sinuous corrugations of said skirt extend across said orifice group in a generally horizontal direction such that said spaced apart crest portions closest to said plane are vertically spaced across the height of said skirt.

5. The apparatus of claim 1 wherein said sinuous corrugations of said skirt extend across said orifice group in a generally vertical direction such that said spaced apart crest portions closest to said plane are horizontally spaced across the length of said skirt.

6. The apparatus of claim 1 wherein said spaced apart crest portions closest to said plane are separated by alternate valley portions of said successive convolutions extending away from said plane to provide areas therebetween for fiber impingement upon said skirt at angles of less than normal to the direction of fiber flow.

7. An apparatus for producing curly glass fibers comprising, in combination, an elongate group of fiber forming orifices having generally vertical axes, means for blowing high velocity fluid alongside said orifices to attenuate said fibers flowing therefrom, a single depending rigid skirt extending along one side of said group of orifices generally parallel to said fiber flow, said skirt having a plurality of sinuous corrugations with portions of successive corrugations extending toward said fiber flow, and means for admitting amounts of induced air flow against said fibers in a lateral direction towards said skirt whereby plastic fibers attenuated by said fluid flow will pass said skirt and impinge upon one or more portions thereof prior to leaving said skirt area.

8. The apparatus of claim 7 wherein said skirt is surrounded on all sides by a peripheral housing having means defining openings laterally adjacent each face of said skirt to cause gaseous flow from said blower to induce lateral air flow through said openings into said housing.

9. The apparatus of claim 8 wherein certain fluid openings in said skirt have means adjustable in area to vary the amount of lateral air flow into said housing.

10. The apparatus of claim 7 wherein said sinuous corrugations of said skirt extend across said orifice group in a generally horizontal direction such that said spaced apart portions closest to said plane are vertically spaced across the height of said skirt.

11. The apparatus of claim 7 wherein said sinuous corrugations of said skirt extend across said orifice group in a generally vertical direction such that said spaced apart portions closest to said plane are horizontally spaced across the length of said skirt.

12. The apparatus of claim 7 wherein said spaced apart portions closest to said plane are separated by alternate portions of said successive corrugations extending away from said plane to provide areas therebetween for fiber impingement upon said skirt at angles of less than normal to the direction of fiber flow.